(12) United States Patent
Nishimiya et al.

(10) Patent No.: US 11,389,880 B2
(45) Date of Patent: Jul. 19, 2022

(54) CHUCK MECHANISM AND TOP JAW

(71) Applicant: KITAGAWA IRON WORKS CO., LTD, Fuchu (JP)

(72) Inventors: Tamio Nishimiya, Fuchu (JP); Kyoichi Nakagawa, Fuchu (JP)

(73) Assignee: KITAGAWA IRON WORKS CO., LTD, Fuchu (JP)

( * ) Notice: Subject to any disclaimer, the term of this patent is extended or adjusted under 35 U.S.C. 154(b) by 0 days.

(21) Appl. No.: 16/967,878

(22) PCT Filed: Feb. 7, 2019

(86) PCT No.: PCT/JP2019/004502
§ 371 (c)(1),
(2) Date: Aug. 6, 2020

(87) PCT Pub. No.: WO2019/159823
PCT Pub. Date: Aug. 22, 2019

(65) Prior Publication Data
US 2021/0046557 A1   Feb. 18, 2021

(30) Foreign Application Priority Data

Feb. 16, 2018 (JP) .............................. JP2018-026149

(51) Int. Cl.
*B23B 31/16* (2006.01)
*B23Q 17/00* (2006.01)

(52) U.S. Cl.
CPC .... *B23B 31/1627* (2013.01); *B23B 2260/104* (2013.01); *B23B 2270/36* (2013.01); *B23Q 17/007* (2013.01); *Y10T 279/1906* (2015.01)

(58) Field of Classification Search
CPC .......... B23B 31/1627; B23B 2260/104; B23B 2270/36; Y10T 279/1906
See application file for complete search history.

(56) References Cited

U.S. PATENT DOCUMENTS 4,434,684 A * 3/1984 Nixon ................. B23B 31/10
 279/111
4,550,922 A 11/1985 Hall et al.
(Continued)

FOREIGN PATENT DOCUMENTS

CN        2239312 Y    11/1996
CN     104002195 A     8/2014
(Continued)

OTHER PUBLICATIONS

Röhm GMBH. "Lathe Chucks Independent Chucks—Product Catalogue 2015/2016." Jan. 1, 2016. 10 pages. XP055782420.
(Continued)

*Primary Examiner* — Eric A. Gates
(74) *Attorney, Agent, or Firm* — Maier & Maier, PLLC (57) ABSTRACT

An object of the present invention is to obtain information corresponding to information, which is readable by sight, but no longer visible. The present invention provides a chuck mechanism comprising: a chuck body including an installation surface and a side surface; and a master jaw provided on the installation surface of the chuck body and configured to move in a radial direction of the chuck body, wherein a first marking is provided on the installation surface of the chuck body, the first marking is product information of the chuck mechanism, the product information has a readable form by sight, and at least one second marking is provided on the installation surface or the side surface of the chuck body, the second marking is information including at least the product information of the first marking, and the information of the second marking has a coded form.

7 Claims, 5 Drawing Sheets

(56) References Cited

U.S. PATENT DOCUMENTS

| | | | | |
|---|---|---|---|---|
| 5,112,067 | A * | 5/1992 | Rinchak | B23B 31/102 279/111 |
| RE35,174 | E * | 3/1996 | Wanner | B25D 17/088 279/19.3 |
| 5,845,912 | A * | 12/1998 | Grupa | B23B 31/16275 279/124 |
| 6,199,462 | B1 * | 3/2001 | Hallett | B23B 31/16283 82/113 |
| 7,108,465 | B2 * | 9/2006 | Kunii | B23B 31/16275 279/143 |
| 7,431,682 | B2 * | 10/2008 | Zeiler | B23B 45/00 483/9 |
| 9,586,270 | B2 * | 3/2017 | Zielonka | B23B 51/0406 |
| 10,576,608 | B2 * | 3/2020 | Sekiya | B24B 53/14 |
| 10,688,567 | B2 * | 6/2020 | Nishimiya | B23B 31/16 |
| 2016/0343276 | A1 | 11/2016 | Aircelle | |
| 2019/0061093 | A1 * | 2/2019 | Sekiya | B24B 53/003 |
| 2020/0356077 | A1 * | 11/2020 | Singer-Schnoeller | G05B 19/4155 |

FOREIGN PATENT DOCUMENTS

| | | | | |
|---|---|---|---|---|
| CN | 104408554 | A | 3/2015 | |
| CN | 104753241 | A | 7/2015 | |
| CN | 205128959 | U | 4/2016 | |
| CN | 105981058 | A | 9/2016 | |
| CN | 206305965 | U | 7/2017 | |
| EP | 1431003 | A1 | 6/2004 | |
| EP | 2923784 | A1 | 9/2015 | |
| JP | 61103710 | A * | 5/1986 | ....... B23B 31/16279 |
| JP | H06-277910 | A | 10/1994 | |
| JP | 2006-114764 | A | 4/2006 | |
| JP | 2015-96284 | A | 5/2015 | |
| JP | 2017-144534 | A | 8/2017 | |

OTHER PUBLICATIONS

Extended European Search Report dated Mar. 17, 2021, in connection with corresponding EP Application No. 19754313.5; 7 pages.

International Search Report dated Apr. 16, 2019 in corresponding International Application No. PCT/JP2019/004502; 4 pages.

Kitagawa Iron Works Co., Ltd., Drawing of Quick jaw-change chuck QJR series, "Quick jaw-change chuck QJR series [online]", <URL:https://prod.kiw.co.jp/mtools/relation/824.html>; <URL:https://prod.kiw.co.jp/mtools/csd/574.html>; <URL:https://prod.kiw.co.jp/mtools/inc/data/PDF/DHP-61P269951.pdf>, Oct. 15, 2013 (retrieval date Mar. 25, 2019), 8 pages.

JIS B 6150 Machine-tools safety—Safety requirements for the design and construction of work holding chucks [online], <URL:http://www.kikakurui.com/66/B6150-2015-01.html> 3.5, 6.3, Dec. 31, 2015 (retrieval date Mar. 26, 2019), 4 pages.

Office Action dated May 31, 2021 in corresponding Chinese Application No. 201980006608.6; 16 pages including English-language translation.

* cited by examiner

CHUCK MECHANISM AND TOP JAW

TECHNICAL FIELD

The present invention relates to a chuck mechanism and a top jaw for grasping a workpiece.

BACKGROUND ART

Chuck mechanisms for grasping a workpiece include a chuck body, a master jaw provided on the chuck body, and a top jaw removably attached to the master jaw. The chuck body has an installation surface, and the master jaw is provided on this installation surface. Further, the master jaw is configured to be movable in the radial direction, and the chuck mechanism has a plurality of the master jaws.

Usually, information such as a format for identifying the product type, serial number, product specification, or manufacturer name (after this simply referred to as "product information") may be engraved on the installation surface of the chuck body. Or a nameplate, including the information, also may be attached to the installation surface of the chuck body.

As a result, in the manufacturing site where the chuck mechanism is introduced (for example, in a mass production line), management and maintenance of the chuck mechanism can be smoothly performed using the engraved product information.

Also, when distributing chuck mechanism products to EU (European Union) member countries, it is required to clearly indicate product information that the chuck mechanism is a conforming product in accordance with the EU Machinery Directive (ANNEX IOF MACHINERY DIRECTIVE) and EU standards (EN1550).

SUMMARY OF INVENTION

Problems to be Solved by the Invention

However, since the product information engraved on the installation surface of the chuck body needs to be visually readable, the engraved area occupies a large area on the installation surface of the chuck body.

On the other hand, a jig for machining a workpiece may be attached to the installation surface of the chuck body. For example, a locator for positioning the workpiece may be attached to the installation surface of the chuck body in order to position the workpiece when grasping the workpiece with the top jaws.

In such a case, a part of the engraved marking provided on the installation surface of the chuck body may be covered with the jig such as the locator, and the part of the engraved marking may be invisible from the outside. Further, the jig once attached is preferably maintained in the attached state for stable workpiece processing. Thus, it is not preferable in terms of production to remove the jig once attached from the chuck for the purpose of only reading the invisible product information.

An object of the present invention is to obtain information corresponding to information, which is readable by sight, but no longer visible.

Solution to Problem

The present invention provides a chuck mechanism comprising: a chuck body including an installation surface and a side surface; and a master jaw provided on the installation surface of the chuck body and configured to move in a radial direction of the chuck body, wherein a first marking is provided on the installation surface of the chuck body, the first marking is product information of the chuck mechanism, the product information has a readable form by sight, and at least one second marking is provided on the installation surface or the side surface of the chuck body, the second marking is information including at least the product information of the first marking, and the information of the second marking has a coded form.

Preferably, the chuck mechanism provides the at least one second marking is provided on a peripheral side of the installation surface of chuck body.

Preferably, the chuck mechanism comprises a top jaw provided removably with the master jaw, in a state that the top jaw is provided with the master jaw, an area, of the installation surface of the chuck body, facing the top jaw is defined as an opposing area, and an area, of the installation surface of the chuck body, excluding the opposing area is defined as the non-opposing area, the at least one second marking is provided on the non-opposing area.

Preferably, the chuck mechanism provides a jig for workpiece machining is provided with the installation surface of the chuck body, the jig for workpiece machining has a hole, a fixed member provided on the installation surface of the chuck body is inserted into the hole, an area, of the installation surface of the chuck body, having the hole arranged therein is defined as a processed area, and an area, of the installation surface of the chuck body, excluding the processed area is defined as a non-processed area, the at least one second marking is provided on the non-processed area.

Preferably, the chuck mechanism provides the jig for workpiece machining is a locator for workpiece positioning.

Preferably, the chuck mechanism provides the at least one second marking is a two-dimensional code.

Preferably, the chuck mechanism provides the information of the at least one second marking includes URL information that can be accessed to web site shown the information of the second marking.

Preferably, the chuck mechanism comprises a top jaw provided removably with the master jaw, the at least one second marking includes a plurality of the second markings, and the second markings are provided on a side surface of the top jaw in addition to the installation surface or the side surface of the chuck body.

According to another aspect of the present invention, a top jaw, provided removably with a master jaw provided on an installation surface of a chuck body of a chuck mechanism, comprises first and second markings provided on a side surface of the top jaw, the first marking is product information of the chuck mechanism, the product information of the first marking has a form that can be read by sight, and the second marking is information including at least the product information of the first marking, and the information of the second marking has a coded form.

Preferably, the top jaw comprises a through-hole inserted a fixed member for attaching the top jaw to the master jaw, a processed area processed according to a shape of a workpiece grasped by the top jaw, the processed area provided at a height position where the through-hole is provided and a non-processed area that is an area excluding the processed area, the non-processed area having the second marking provided thereon.

The Effects of Invention

According to the present invention, the at least one second marking is provided on the installation surface or side surface of the chuck body. Thus, even if the first marking provided on the installation surface of the chuck body cannot be visually recognized from the outside, the operator can obtain the product information, which cannot be visually recognized from the outside, by scanning the second marking with the code scanning device (for example, a camera or a code scanner).

BRIEF DESCRIPTION OF DRAWING

FIGS. 5A and 5B are perspective views schematically showing the configuration of the top jaw attached to the master jaw.

DESCRIPTION OF EMBODIMENTS

Hereinafter, the embodiment of the present invention will be described in detail with reference to the drawings. The present invention is not limited to the following embodiment. Further, appropriate changes can be made without departing from the range of the effect of the present invention.

Figure 1:
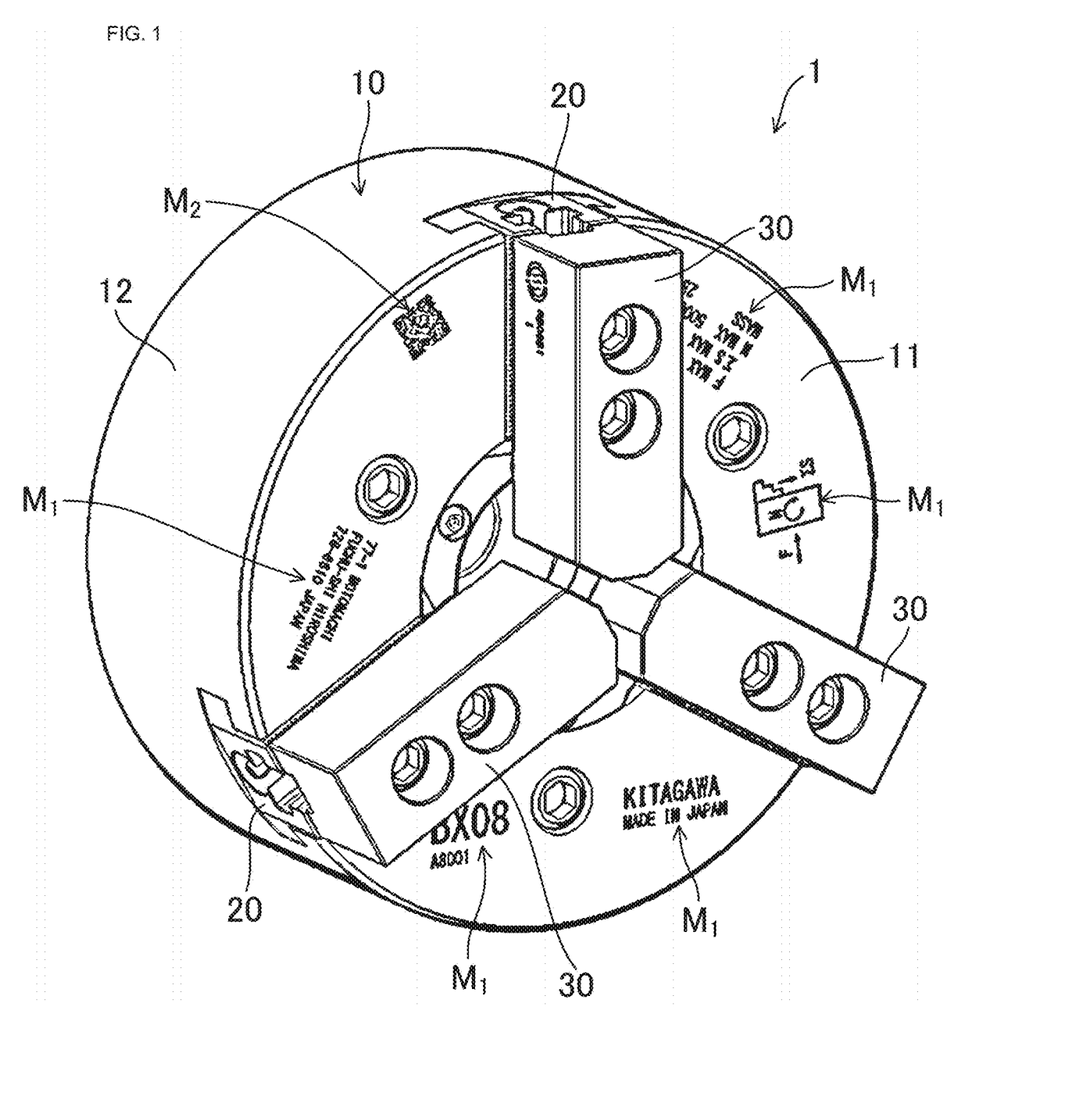
FIG. 1 is a perspective view schematically showing the structure of the chuck mechanism in the embodiment of the present invention.

FIG. 1 is a perspective view showing the structure of the chuck mechanism in the embodiment of the present invention.

As shown in FIG. 1, the chuck mechanism 1 in this embodiment includes a chuck body 10, a plurality of (three in this embodiment) master jaws 20 provided on an installation surface 11 (front surface) of the chuck body 10, a plurality of top jaws 30 removably attached to the master jaws 20 respectively. The master jaw 20 is configured so that it can be moved in the radial direction.

In this embodiment, the first marking $M_1$ is provided on the installation surface 11 of the chuck body 10. The first marking $M_1$ is the product information of chuck mechanism 1. Here, the product information includes information about the product of chuck mechanism 1. The product information includes, for example, the format for identifying the product type, serial number, product specifications, manufacturer name. The product information is not limited to these examples.

The first marking $M_1$ is shown in a readable form by sight. First marking $M_1$ is represented by, for example, letters, numbers, and symbols. Moreover, the size of the first marking $M_1$ is set that the product information can be read by sight. Further, a plurality of first markings $M_1$ having different product information respectively may be provided on the installation surface 11 of the chuck body 10. The first marking $M_1$ can be provided on the installation surface 11 of the chuck body 10 by for example engraving.

At the manufacturing site where the chuck mechanism 1 is introduced (for example, mass production line), by reading the product information indicated by the first marking $M_1$, it is possible to smoothly manage and maintain the chuck mechanism 1 based on the product information.

In this embodiment, as shown in FIG. 1, apart from the first marking $M_1$, the second marking $M_2$ is provided on the installation surface 11 of the chuck body 10. The second marking $M_2$ is information like the first marking $M_1$, but the second marking $M_2$ does not have a readable form by sight. That is, the second marking $M_2$ has the coded form. The second marking $M_2$ is used to obtain the product information when the first marking $M_1$ becomes invisible in the manufacturing site where the chuck mechanism 1 is introduced. Therefore, the information of the second marking $M_2$ includes at least the product information indicated in the first marking $M_1$.

Here, the second marking $M_2$ may be the coded product information of the chuck mechanism 1. In the form of the second marking $M_2$, for example, a two-dimensional code such as a QR code (registered trademark), a data matrix, or PDF417 can be used. Further, the operator can obtain the product information of the chuck mechanism 1 by reading the second marking $M_2$ with, for example, a camera or a code scanner.

In the manufacturing site where the chuck mechanism 1 is introduced, the following cases, in which the first marking $M_1$ becomes invisible, are assumed.

Figure 2:
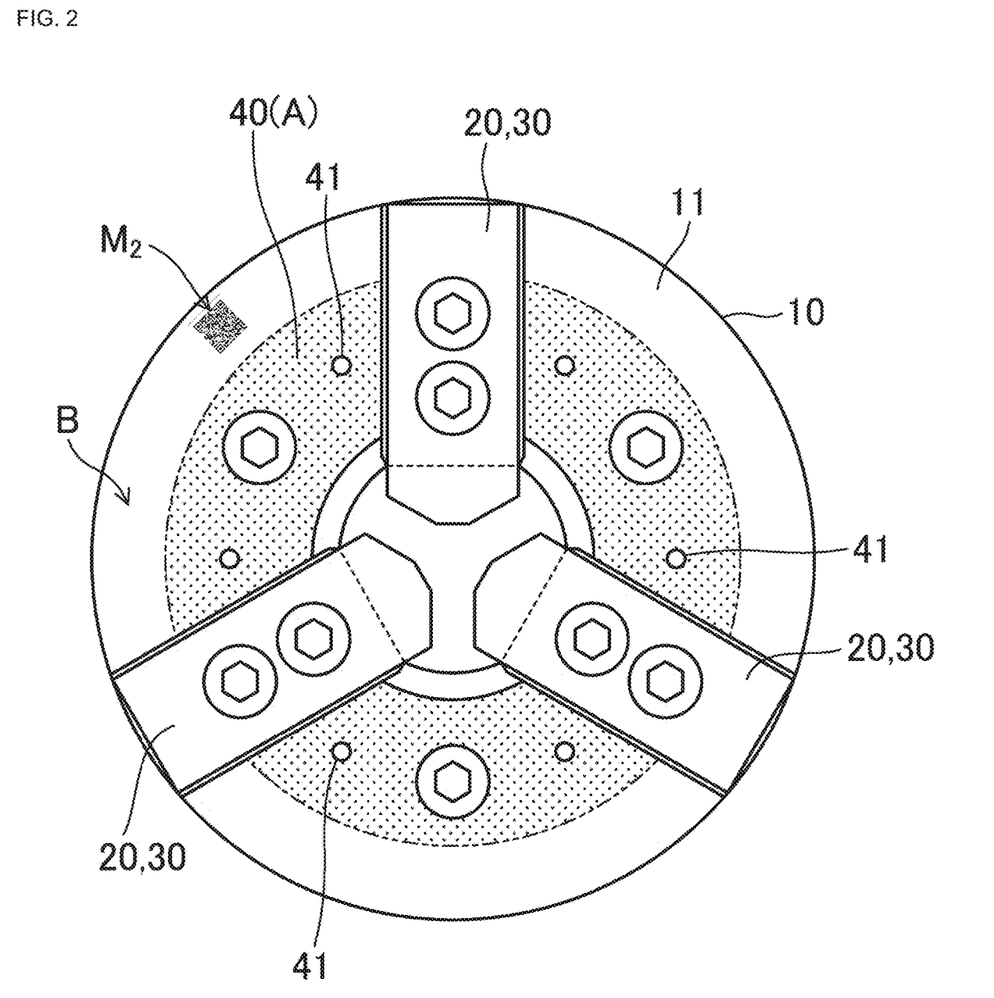
FIG. 2 is a front view of the chuck mechanism showing the installed state of the locator, for positioning workpiece, to the installation surface of the chuck body.

FIG. 2 is a front view of the chuck mechanism 1 showing the installed state of the locator 40, for positioning workpiece, to the installation surface 11 of the chuck body 10. Here, the locator 40 is used as a jig for positioning the workpiece in the chuck rotation axis direction and for centering the workpiece when grasping the workpiece with the top jaw 30 and processing the workpiece. Note that, in FIG. 2, only the outer contour of the locator 40 is shown by a virtual line. Also, the first marking $M_1$ provided on the installation surface 11 of the chuck body 10 is omitted.

As shown in FIG. 2, the locator 40 is attached to the installation surface 11 of the chuck body 10 so as to cover the area on the inner peripheral side excluding the master jaw 20 and the top jaw 30. Therefore, the first marking $M_1$ is covered by locator 40, and the operator cannot read the first marking $M_1$ from the outside. Here, the area of the installation surface 11 covered by the locator 40 is defined as an area A (covered area). The first marking $M_1$ is located in the area A.

In this embodiment, as shown in FIG. 2, since the second marking $M_2$ is provided on the area B (uncovered area) which is an area other than the area A in installation surface 11 of chuck body 10, even if the operator cannot read a part of the first marking $M_1$ by sight, the operator can scan the information of the second marking $M_2$. This allows the operator to obtain the required product information. Further, the operator can obtain the required product information while the locator 40 is installed on the installation surface 11 of the chuck body 10, so the operator can perform stable workpiece processing.

Since the area B is the area where the first marking $M_1$ can be visually recognized from the outside, it can also be defined as a visible area or an external appearance exposed area.

Also, the area A is surrounded by the area B. In other words, the area B is located around the area A. That is, the area B is arranged on the peripheral side of the installation surface 11, and the area A is arranged on the central side of the installation surface 11. The second marking $M_2$ is placed in the area B, so the second marking $M_2$ is provided on the peripheral side of the installation surface 11. The second marking $M_2$ is not limited to the form shown in FIG. 2. The second marking $M_2$ may be provided on the side surface 12 of the chuck body 10 instead of the installation surface 11. Like the area B, side surface 12 is also an area that is not covered by locator 40. Further, the second marking $M_2$ may be provided on both the installation surface 11 and the side surface 12, or may be provided on one of the installation surface 11 and the side surface 12.

Figure 3:
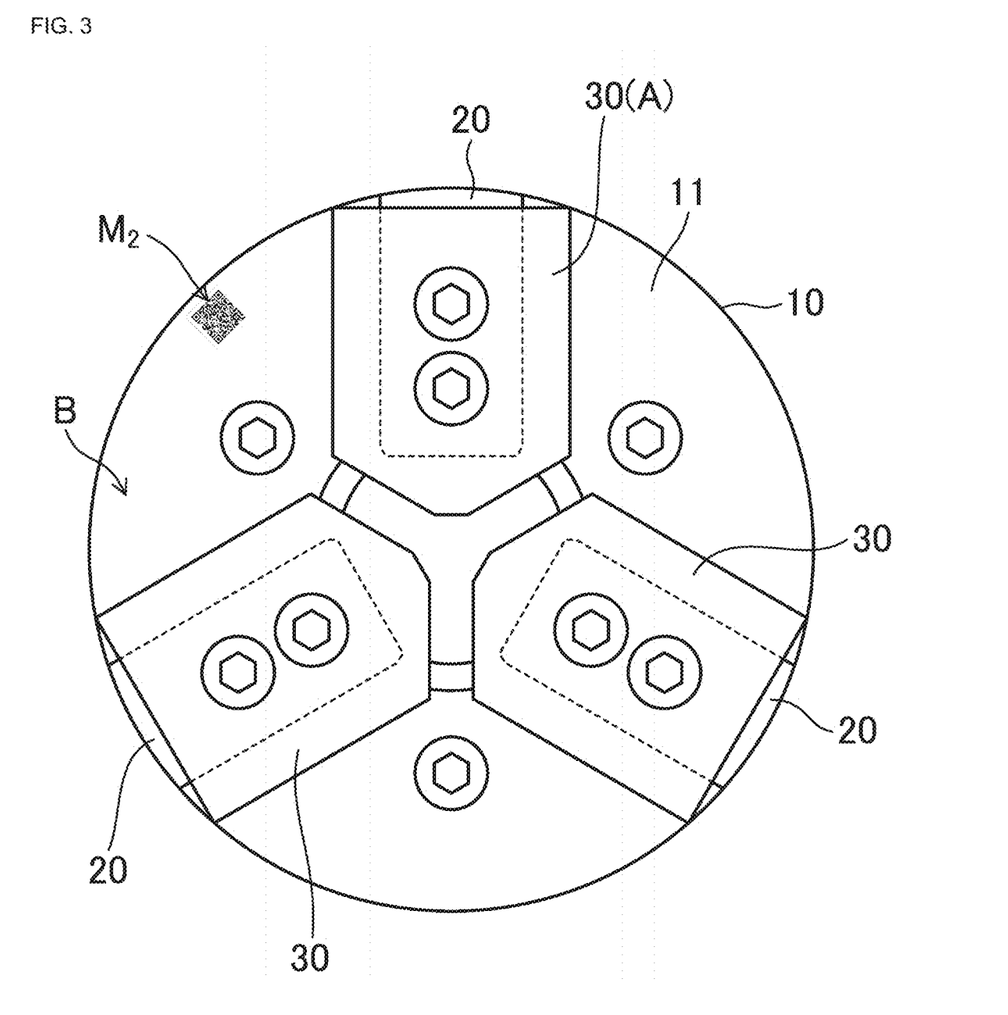
FIG. 3 is a view showing one case that the first marking cannot be visually recognized in the manufacturing site where the chuck mechanism is introduced.

FIG. 3 is a view showing one case that the first marking $M_1$ cannot be visually recognized in the manufacturing site where the chuck mechanism 1 is introduced.

As shown in FIG. 3, the top jaw 30 is formed wider than the master jaw 20. In FIG. 3, the first marking $M_1$ provided on the installation surface 11 of the chuck body 10 is omitted.

The top jaw 30 can be replaced according to the shape of the workpiece grasped by the top jaw 30. When the top jaw 30, which has wide width, is attached to the master jaw 20, as shown in FIG. 3, on the installation surface 11 of the chuck body 10, an protruding area where the top jaw 30 protrudes from the master jaw 20 in the width direction faces the top jaw 30. This protruding area may be in contact with the top jaw 30 or may be separated from the top jaw 30. If the first marking $M_1$ is placed in this protruding area, the first marking $M_1$ is hidden by the top jaw 30, and the operator cannot visually recognize the first marking $M_1$. Here, in the state that the top jaw 30 is provided with the master jaw 20, an area of the installation surface 11 of the chuck body 10 facing the top jaw 30 is defined as an area A (opposing area), an area of the installation surface 11 of the chuck body 10 excluding the opposing area is defined as an area B (non-opposing area). The first marking $M_1$ is provided on the area A.

In this embodiment, as shown in FIG. 3, since the second marking $M_2$ is provided on the area B other than the area A, even if the operator cannot see a part of first marking $M_1$, the operator can scan the second marking $M_2$. This allows the operator to obtain the required product information. Further, the operator can obtain the necessary product information while the top jaw 30 remains installed in the master jaw 20, so that the operator can perform stable work processing.

Further, the second marking $M_2$ is not limited to the form shown in FIG. 3, and may be provided on the side surface 12 of the chuck body 10 instead of the installation surface 11. The side surface 12 is also an area that is not covered by the locator 40, like the area B (non-facing area). Further, the second marking $M_2$ may be provided on both the installation surface 11 and the side surface 12, or may be provided on one of the installation surface 11 and the side surface 12.

Figure 4:
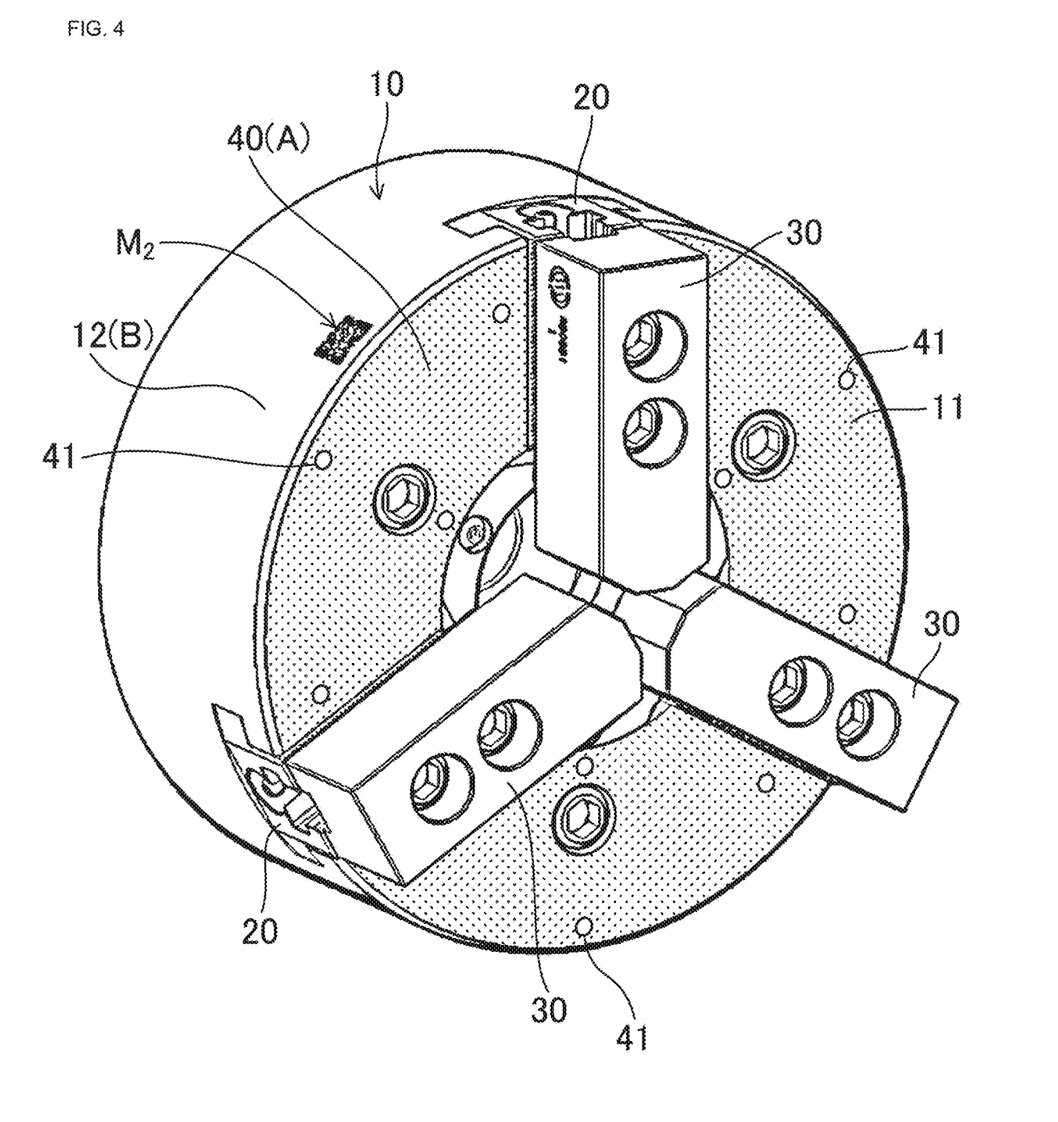
FIG. 4 is a view showing another case that the first marking cannot be visually recognized in the manufacturing site where the chuck mechanism is introduced.

FIG. 4 is a diagram showing another case where the first marking $M_1$ may not be visible at the manufacturing site where the chuck mechanism 1 is introduced.

FIG. 2 shows an example in which the locator 40 is installed on the installation surface 11 of the chuck body 10 so as to cover the area on the inner peripheral side excluding the master jaw 20 and the top jaw 30. In FIG. 4, the locator 40 is attached to the installation surface 11 of the chuck body 10 so as to cover the entire surface excluding the master jaw 20 and the top jaw 30. In FIG. 4, the first marking $M_1$ provided on the installation surface 11 of the chuck body 10 is omitted.

In such a case, since all of the installation surface 11 of the chuck body 10 corresponds to the area A (covered area), the second marking $M_2$ is preferably provided on the side surface 12 of the chuck body 10.

When the chuck mechanism 1 is installed on a machine tool, a part, which is provided in a side opposite to a side of the installation surface 11 of the chuck body 10, of the side surface 12 of the chuck body 10 may be covered with the machine tool. Therefore, when the second marking $M_2$ is provided on the side surface 12 of the chuck body 10, the second marking $M_2$ is preferably provided on a part, which is provided in the side of the installation surface 11 of the chuck body 10, of the side surface 12.

By the way, as shown in FIGS. 2 and 4, when the locator 40 is installed on the installation surface 11 of the chuck body 10, the operator additionally forms a screw hole 41 for attaching the locator 40 to the installation surface 11 of the chuck body 10. Here, the screw hole 41 of the embodiment corresponds to the hole.

In such a case, if the first marking $M_1$ is provided on the additionally formed area, the product information provided on the first marking $M_1$ is lost. Thus, even if the operator removes the locator 40, the operator cannot obtain the information indicated by the first marking $M_1$.

Therefore, assuming such a case, it is preferable that the second marking $M_2$ is provided on a non-processed area when the jig for workpiece machining (for example locator 40) is attached. The non-processed area is an area excluding a processed area. In other words, an area, of the installation surface 11 of the chuck body 10, the screw hole 41 being arranged is defined as the processed area, and an area, of the installation surface 11 of the chuck body 10, excluding the processed area is defined as the non-processed area. Then, the second marking $M_2$ is preferably provided on the non-machined area.

As described above, in this embodiment, the first marking $M_1$ is provided on the installation surface 11 of the chuck body 10, and the second marking $M_2$ is provided on the installation surface 11 or the side surface 12 of the chuck body 10. As a result, even when the product information provided on the first marking $M_1$ cannot be visually recognized from the outside, the operator can obtain the product information by using the second marking $M_2$.

Figure 5A:
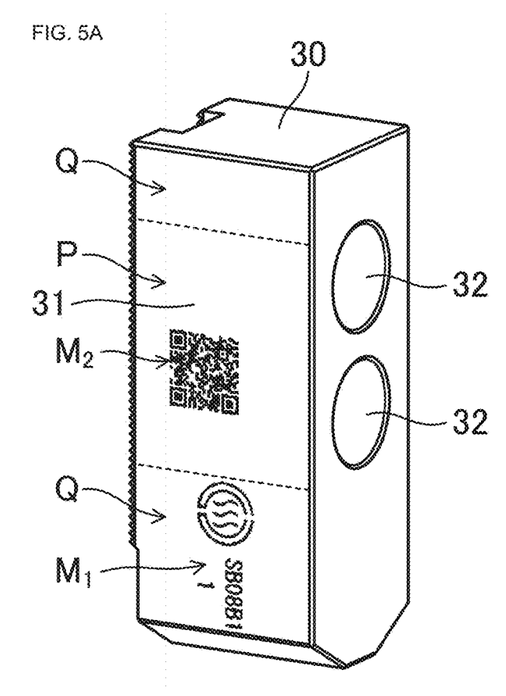
FIG. 5A is the view before processing a grasped side of the workpiece.
Figure 5B:
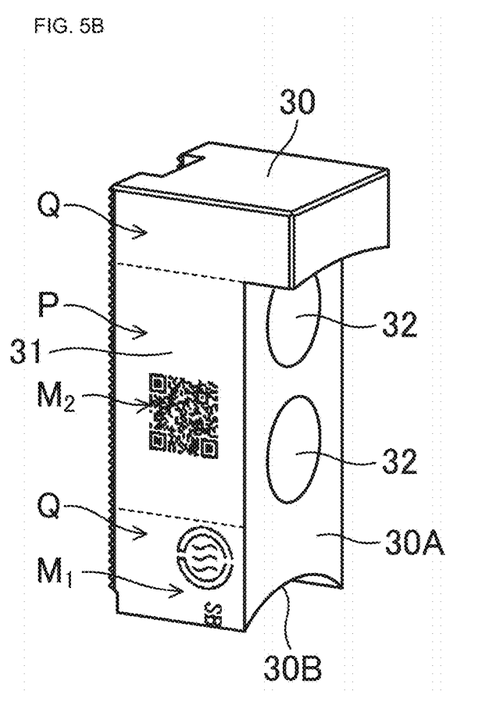
FIG. 5B is the view after processing the grasped side of the workpiece.

FIGS. 5A and 5B are perspective views schematically showing the configuration of the top jaw 30 attached to the master jaw 20. FIG. 5A is the view before processing a grasped side of the workpiece, and FIG. 5B is the view after processing the grasped side of the workpiece.

As shown in FIG. 5A, the side surface 31 of the top jaw 30 is also provided with the first marking $M_1$ capable of visually reading the product information of the chuck mechanism 1 or the product information of the top jaw 30.

However, in the top jaw 30, as shown in FIG. 5B, the front surface 30A or the end surface 30B may be processed according to the shape of the workpiece to be grasped. Therefore, on the side surface 31 of the top jaw 30, the first marking $M_1$ (or a part thereof) provided on the processed areas (processed areas Q) cannot be visually recognized from the outside.

Usually, as shown in FIG. 5A, the top jaw 30 has holes 32 (two in FIG. 5A) into which fixed members (bolts) for attaching the top jaw 30 to the master jaw 20 are inserted. Therefore, a portion of the side surface 31, where the hole 32 is arranged, is a non-processed area P. Here, the hole 32 is a through-hole formed in the top jaw 30. The non-processed area P is provided at a height position where the hole 32 is provided. In this embodiment, a position of an upper end of the non-processed area P corresponds to a height position of an uppermost portion of the uppermost hole 32 among the plurality (two) of holes 32, and a position of a lower end of the non-processed area P corresponds to a height position of an lowermost portion of the lowermost hole 32 among the plurality (two) of holes 32. And, in the embodiment, the non-processed area P is arranged between the pair of the processed areas Q.

In the present embodiment, as shown in FIGS. 5A and 5B, the second marking $M_2$ is provided on the non-processed area P, which is the area excluding the area Q, of the side surface 31 of the top jaw 30. Thus, even if the operator cannot visually recognize a part of the first marking $M_1$, the operator can scan the second marking $M_2$. This allows the operator to obtain the required product information. In addition, the operator can obtain the necessary product information while the top jaw 30 remains installed in the master jaw 20, and thus the lost information can be obtained.

The side surface 31 of the top jaw 30 has a smaller area than the installation surface 11 of the chuck body 10. Therefore, only the minimum product information can be provided on the first marking $M_1$. On the other hand, since the second marking $M_2$ has the coded product information, it is possible to include a lot of product information even in a small area. Since the second marking $M_2$ is provided on the side surface 31 of the top jaw 30, a large amount of information is provided on a limited area, the configuration of the embodiment enables effective use of the side surface 31 of the top jaw 30.

The second marking $M_2$ provided on the side surface 31 of the top jaw 30 may be the same as or different from the second marking $M_2$ provided on the installation surface 11 of the chuck body 10.

Although the present invention has been described above with reference to a suitable embodiment, such description is not a limitation and, of course, various modifications are possible. For example, the locator 40 has been described as an example of the workpiece machining jig attached to the installation surface 11 of the chuck body 10 in the above embodiment. The jig is not limited to this, and may be a jig for processing another work. Further, the jig for working the workpiece is not limited to this configuration, and may include a balance weight attached to the chuck body 10 to secure the balance when the chuck mechanism 1 rotates at a high speed.

Further, the above-described embodiment shows the second marking $M_2$ having the coded information such as the format for identifying the product type, the serial number, the product specification, and the manufacturer name. The present invention is not limited to this, and may be, for example, coded URL information that enables access to a website showing product information of the chuck mechanism. In addition, this URL may include a model number or serial number for identifying the product type as a parameter. In addition, the product information of the chuck mechanism may include information such as an instruction manual information of the chuck mechanism, a defect response information, and maintenance and inspection information.

In addition, since the second marking $M_2$ in this embodiment have a coded pattern, even if a part of the pattern is lost, the original information is not lost due to an error correction function. Therefore, the product information provided on the second marking $M_2$ can be scanned even if chips and dirt generated during work processing adhere to the pattern.

DESCRIPTION OF REFERENCE SIGNS

1: chuck mechanism
10: chuck body
11: installation surface of chuck body
12: side surface of chuck body
20: master jaw
30: top jaw
31: side surface of top jaw
32: hole
40: locator
41: screw hole

The invention claimed is:

1. A chuck mechanism comprising:
a chuck body including an installation surface and a side surface; and
a master jaw provided on the installation surface of the chuck body and configured to move in a radial direction of the chuck body, wherein a first marking is provided on the installation surface of the chuck body, the first marking is product information of the chuck mechanism, the product information of the first marking includes at least one of information representing a model number of the chuck mechanism and information representing a serial number of the chuck mechanism, the information representing the model number and the information representing the serial number include at least one of a letter and a number so that humans can understand at least one of the model number and the serial number when at least the one of the letter and the number is visually recognized by the humans, at least one second marking is provided on a peripheral side of the installation surface or the side surface of the chuck body, the at least one second marking is a two-dimensional code that does not include the letter and the number, and the second marking includes the same information as the product information of the first marking, wherein the installation surface of the chuck body is configured so that a jig for workpiece machining can be attached, an area of the installation surface of the chuck body that is processed when the jig for workpiece machining is attached to the installation surface of the chuck body is defined as a processed area, an area of the installation surface of the chuck body, excluding the processed area, is defined as a non-processed area, and the at least one second marking is provided on the non-processed area.

2. The chuck mechanism of claim 1, further comprising:
a top jaw provided removably with the master jaw, wherein in a state that the top jaw is provided with the master jaw, an area, of the installation surface of the chuck body, facing the top jaw is defined as an opposing area, and an area, of the installation surface of the chuck body, excluding the opposing area is defined as the non-opposing area, the at least one second marking is provided on the non-opposing area.

3. The chuck mechanism of claim 1, wherein the jig for workpiece machining has a hole, a fixed member provided on the installation surface of the chuck body is inserted into the hole, the processed area is the area, of the installation surface of the chuck body, having the hole arranged therein.

4. The chuck mechanism of claim 3, wherein the jig for workpiece machining is a locator for workpiece positioning.

5. The chuck mechanism of claim 1, wherein the information of the at least one second marking includes URL information that can access a web site showing the information of the second marking.

6. The chuck mechanism of claim 1, further comprising:
a top jaw provided removably with the master jaw, wherein the at least one second marking includes a plurality of the second markings, and the second markings are provided on a side surface of the top jaw in addition to the installation surface or the side surface of the chuck body.

7. A top jaw provided removably with a master jaw provided on an installation surface of a chuck body of a chuck mechanism, the top jaw comprising:
   a side surface;
   a front surface;
   a through-hole, for receiving a fixed member for attaching the top jaw to the master jaw, formed on the front surface; and
   first and second markings provided on the side surface of the top jaw, wherein, when a processed area and a non-processed area are defined on the side surface of the top jaw, the non-processed area extends from an upper end position to a lower end position of a range in which the through-hole is arranged, the processed area is provided adjacent to the non-processed area and does not overlap with the through-hole when viewed from the side surface of the top jaw, the first marking is provided on the processed area, and the second marking is provided only on the non-processed area, the first marking includes product information representing a model number of the chuck mechanism or product information representing a model number of the top jaw, the information representing the model number includes at least one of a letter and a number so that humans can understand the model number when at least the one of the letter and the number is visually recognized by the humans, the at least one second marking is a two-dimensional code that does not include the letter and the number, and the second marking includes the same information as the product information of the first marking.

* * * * *